US005144110A

United States Patent [19]

Marantz et al.

[11] Patent Number: 5,144,110

[45] Date of Patent: Sep. 1, 1992

[54] PLASMA SPRAY GUN AND METHOD OF USE

[76] Inventors: Daniel R. Marantz, 25 Cedar La., Sands Point, N.Y. 11050; Herbert Herman, 30 Waterview Dr., Pt. Jefferson, N.Y. 11777

[21] Appl. No.: 522,351

[22] Filed: May 11, 1990

Related U.S. Application Data

[63] Continuation-in-part of Ser. No. 267,145, Nov. 4, 1988, Pat. No. 4,982,067.

[51] Int. Cl.[5] .......... B23K 9/00

[52] U.S. Cl. .......... 219/121.48; 219/121.47; 219/121.59; 219/121.52; 219/121.5; 427/34

[58] Field of Search .......... 219/121.47, 76.16, 76.15, 219/75, 121.59, 121.48; 427/34

[56] References Cited

U.S. PATENT DOCUMENTS

| | | | |
|---|---|---|---|
| Re. 32,908 | 4/1989 | Pfender | 219/121.368 |
| 2,806,124 | 9/1957 | Gage | 219/75 |
| 2,858,411 | 10/1958 | Gage | 219/75 |
| 3,140,380 | 7/1964 | Jensen | 427/348 |
| 3,246,114 | 4/1966 | Matvay | 219/76 |
| 3,312,566 | 4/1967 | Winzeles et al. | 219/76.16 |
| 3,472,995 | 10/1969 | Browning et al. | 219/76.16 |
| 3,770,935 | 11/1973 | Tateno et al. | 219/121.47 |
| 3,947,607 | 3/1976 | Gazzard et al. | 427/348 |
| 3,989,512 | 11/1976 | Sayce | 75/11 |
| 4,341,941 | 7/1982 | Tateno | 219/121.48 |
| 4,386,112 | 5/1983 | Eaton et al. | 427/34 |
| 4,668,852 | 5/1987 | Fox et al. | 219/76.168 |
| 4,689,468 | 8/1987 | Muehlberger | 219/76.16 |
| 4,818,837 | 4/1989 | Pfender | 219/121.48 |

FOREIGN PATENT DOCUMENTS

| | | |
|---|---|---|
| 51687 | 11/1987 | U.S.S.R. . |
| 959472 | 6/1964 | United Kingdom . |

*Primary Examiner*—Mark H. Paschall

*Attorney, Agent, or Firm*—Dykema Gossett

[57] ABSTRACT

The plasma generating apparatus and method of this invention is particularly, although not exclusively, suitable for plasma spraying. The plasma spray apparatus and method of this invention generates a free-standing electromagnetically coalesced stable plasma through which feedstock may be fed, eliminating problems with conventional radial feed plasma guns. The plasma spray apparatus of this invention includes a plurality of pilot plasma guns preferably displaced symmetrically about a common axis and a main transfer electrode located downstream of the pilot plasma guns having a nozzle bore coaxially aligned with the common axis. The plasmas generated by the pilot plasma guns are directed into the throat of the main transfer electrode bore and a second plasma gas is supplied to the throat of the main transfer electrode bore which is ionized and coalesced with the plasmas generated by the pilot plasma guns, generating a free-standing electromagnetically coalesced plasma. The second plasma gas may be a conventional inert or unreactive plasma gas or more preferably a reactive plasma gas increasing the energy of the free-standing plasma and providing additional advantages. The feedstock may then be fed through the bore of the transfer electrode and the free-standing electromagnetically coalesced plasma, uniformly heating the feedstock and permitting the use of a wide range of feedstock material forms and types, including particulate feedstock having dissimilar particle sizes and densities, slurries, sol-gel fluids and solutions.

39 Claims, 7 Drawing Sheets

IFig-1

PLASMA SPRAY GUN AND METHOD OF USE

This application is a continuation-in-part of application Ser. No. 267,145 filed Nov. 4, 1988, which issued as U.S. Pat. No. 4,982,067 on Jan. 1, 1991.

BACKGROUND OF THE INVENTION

Plasma torches were developed primarily as a high temperature heat source and are now widely used commercially for cutting, welding, coating and high temperature treatment of materials. Conventional direct current commercial plasma torches or guns include a pointed rod-like cathode generally formed of thoriated tungsten axially located within a bore in the body portion of the gun and an annular anode located downstream of the cathode having a nozzle orifice coaxially aligned with the cathode. A plasma-forming gas, typically argon or mixtures of argon and helium or argon and hydrogen, is introduced into the body portion of the gun such that the gas flows in an axial direction around the cathode and exits through the anode nozzle orifice. Plasma generation occurs in the gun in the arc region between the anode and the cathode. The plasma is typically formed by initiating an arc between the anode and cathode using a high-frequency starting pulse, wherein the arc heats and ionizes the plasma gas to temperatures of about 12,000 degrees K. The heated and expanded plasma gas is then exhausted at high speed through the nozzle orifice. The gas flow through the gun can be axial or introduced in a manner so as to cause a vortex-type flow. The electrical characteristics of the plasma arc are determined by the gas flow rate, gas composition, anode nozzle orifice diameter and the electrode spacing.

Where the plasma gun is used for spraying a coating, the feedstock is usually in powder form suspended in a carrier gas and injected radially into the plasma effluent, either internally or externally of the nozzle exit depending on the gun manufacturer. Because the temperature drops off sharply in the plasma after it exits the anode nozzle, the powder is preferably introduced as close as possible to the point of plasma generation. U.S. Pat. No. 2,806,124 is an early disclosure of the basic principles of plasma technology and U.S. Pat. No. 3,246,114 includes an early disclosure of a commercial plasma gun.

Because of the geometry of a plasma gun and potential cathode deterioration, as discussed below, it is not possible to introduce the feedstock material axially through a conventional plasma spray gun, although the potential advantages have long been recognized. In a typical plasma jet coating apparatus, the feedstock powders are introduced radially into the plasma stream downstream from the plasma origin, either perpendicular to the axis or inclined in a direction with or countercurrent to the flow of the plasma jet. As will be understood, the plasma interferes with particle penetration with a resistance that requires particle momentum sufficient to penetrate to the axis of the plasma jet. The particle momentum is provided by the carrier gas.

Further, thermal spray powders never have an absolutely uniform particle size and generally include a broad distribution of particle sizes. Carrier gas flow rate must further be adjusted dependent upon the particle size, wherein the smaller or lighter particles require a greater carrier-gas flow rate. Nevertheless, the particle injection velocity distribution will be broad even for a narrow particle size distribution and blends or mixtures of feed powders have very limited commercial applications. Therefore, heat and momentum transferred to the injected particles will vary over a wide range, resulting in a broad range of velocity and surface temperature distribution upon impact of the particles with the target or substrate. Because of the greater momentum of the larger or heavier particles, the larger particles will penetrate through the plasma jet and become entrained in the outer, colder gas region or ejected out of the plasma jet, resulting in unmelted fringe regions of the deposit coating. Very small or light particles of low momentum will fail to penetrate the plasma jet and will also be included in the fringe area. Very small particles which enter the plasma jet core may also overheat and vaporize. Therefore, only a fraction of the particles enter the core of the plasma jet and are deposited as a highly dense layer on the target substrate. The unmelted or partially melted particles may affect the density of the deposit. In a typical application, the deposition efficiency (i.e., the ratio of material fed into the plasma jet gun compared to the portion which actually forms the coating) is typically low, usually well below 70% for high melting materials, such as oxide ceramics and intermetallic compounds.

Unreactive gases, such as argon or helium, are employed as the plasma gas to avoid erosion or deterioration of the cathode electrode. As described above, the cathode is normally formed of thoriated tungsten and the electrode is operated at temperatures above 1000 degrees Centigrade. Diatomic gases, such as hydrogen or nitrogen, may be added to the inert plasma gas to enhance the power output of the plasma jet torch. However, reactive gases, such as oxygen, cannot be employed because reactive plasma gases would result in oxidation corrosion of the cathode. The use of reactive gases or reactive gas mixtures will cause the cathode to undergo local deterioration, thereby causing the cathode point of arc origination to wander, resulting in plasma arc instability or "arc wandering"; however, it would be desirable in a number of applications to utilize certain reactive gases, such as oxygen or oxygen bearing gas mixtures as the plasma forming gas. For example, certain plasma jet applications result in oxygen depletion of the feedstock. The utilization of oxygen, for example, as the plasma gas would result in restoration of oxygen in the resulting coating and eliminate the requirement of a post-spray oxygen replacement anneal.

It would also be very desirable to raise the operating power level of conventional plasma jet guns without decreasing energy efficiency or deterioration of the electrical components. In a typical plasma jet gun, the energy efficiency decreases as the operating energy level increases because of the inherently high electrical current operation and energy losses in the gun and power cables. Presently, energy is increased in a plasma jet gun by raising the current. Since the power input to a plasma jet gun is a product of the voltage and the current (Power=VxI), it would be desirable to raise the operating power level by increasing the plasma voltage rather than the current. Since the operating voltage is directly related to the plasma-forming gas used, a well as the cathode-anode spacing, it would be desirable to adjust these parameters for optimum operation. However, as described above, plasma forming gas selection is restricted to the group of unreactive or inert gases to avoid cathode deterioration. Cathode-anode spacing is limited due to the problems of initiating and maintaining stable plasma are conditions with large interelectrode spacing.

Thus, the present plasma jet technology is limited in at least three important respects. First, radial injection of powdered feedstock results in poor deposition efficiency, reduced density of the deposit and requires a narrow range of feedstock particle size where uniform coatings are required. Second, reactive gases or reactive gas mixtures cannot be used as the plasma-forming gas to avoid deterioration of the cathode and arc wandering. Finally, the operating power level of conventional plasma jet guns cannot be significantly increased without decreasing the energy efficiency.

Various attempts have been made to avoid the problems of radial feed of plasma jet guns without commercial success. The principal solutions proposed by the prior art include (a) hollow cathode plasma guns, (b) RF (radio frequency) guns and (c) a plurality of plasma guns with a single feed. The hollow cathode gun, as the name implies, utilizes a hollow cathode tube, rather than a conventional rod-shaped cathode. The RF plasma gun employs a rapidly alternating electric field generated by a radiofrequency coil which replaces the arc as the plasma source. Although the hollow cathode and RF plasma guns have commercial promise, neither system has achieved commercial success.

As evidenced by U.S. Pat. No. 3,140,380 of Jensen, assigned to Avco Corporation, others have tried to merge two or more plasma effluents into a "joint plasma effluent into which a coating material is fed and reduced to substantially molten particles" for deposition on a substrate. In the prior art apparatus disclosed in the Jensen patent, a plurality of plasma guns or "plasma generating means" are "displaced symmetrically" with relation to a common axis such that the "plasma effluents are directed to intercept at a point and merged to form a joint plasma effluent." The plasma effluents from the individual plasma torches are then fed through a nozzle opening in the common axis and wire or powdered feedstock is fed through the nozzle opening in the common axis. As will be understood, this method of forming a "joint plasma effluent" does not result in a single or coalesced free-standing plasma and the impinging plasma effluent results in turbulence at the point of impingement through which the feedstock is fed. Further, the temperature of the plasma effluent at the point of impingement through which the feedstock is fed is substantially lower than the temperature of the plasma cores, resulting in lower efficiency than would be obtained for a true axial feed, wherein the feedstock particles are fed into the plasma core. This attempt to provide an axial feed for plasma spraying has not found commercial applications and the thermal spray industry therefore continues to utilize radial feed for plasma torches.

The prior art also includes other attempts to combine two or more plasmas as disclosed in Tateno, et al U.S. Pat. No. 3,770,935. In the plasma jet generator disclosed in the Tateno, et al patent, a positive plasma jet torch is aligned at a right angle to a negative plasma jet torch, such that the plasmas meet and function as a plasma jet torch of straight polarity to achieve a high arc voltage and improved efficiency. However, the plasma jet generator must utilize an inert plasma gas and radial feed of the feedstock. This system has not been introduced commercially and does not overcome the problems with radial feed as described above.

The prior art also includes numerous examples of transferred arc plasma guns or torches. Transferred arc plasma torches, wherein the substrate is connected electrically to the gun, has achieved commercial acceptance in many applications. It is also possible to utilize a second annular anode electrode, downstream of the primary anode, to transfer the plasma axially as disclosed in Gage U.S. Pat. No. 2,858,411. Transferred arc technology has not, however, resulted in a commercial axial feed plasma gun utilizing powdered feedstock, which is a primary object of the present invention.

Thus, although the problems of radial feed in commercial plasma spray apparatus have long been recognized, the prior art has failed to solve the problems described above in a commercially successful plasma spray system. There is, therefore, a long-felt need for an axial feed plasma spray system which has not been met by the prior art.

SUMMARY OF THE INVENTION

In its broadest terms, the plasma spray apparatus and method of this invention generates a free-standing electromagnetically coalesced stable plasma permitting true axial feed in a plasma spray system. Feedstock, in particulate or rod form, may be fed through the axis of the free-standing plasma, resulting in improved efficiency, including improved heat transfer and uniform heating of the feedstock, thereby eliminating the problems of radial feed. Further, the plasma generating apparatus and method of this invention may utilize reactive gases or reactive gas mixtures as the plasma forming gas, without resulting in deterioration of the cathode or arc wandering. Finally, the operating power level of the plasma jet torch of this invention may be significantly increased, without decreasing the energy efficiency of the system or damaging the electrical components.

The plasma spray apparatus of this invention includes at least two, three of more preferably at least four plasma generating means or pilot plasma guns, each generating a plasma of ionized plasma gas, means for extending and electromagnetically coalescing the plasmas into a free-standing plasma of ionized gas and means for supplying feedstock axially through the free-standing plasma. The pilot plasma guns may be conventional plasma generating torches, each including a pair of electrodes and means supplying a substantially inert ionizable plasma gas between the electrodes, wherein the ionizable plasma gas flows through an arc generated between the electrodes, establishing a plasma of ionized gas. In the disclosed embodiment of the plasma spray apparatus of this invention, the pilot plasma guns each include a rod-shaped cathode, an annular body portion surrounding the cathode in spaced relation, an annular anode downstream of the cathode having a nozzle opening axially aligned with the cathode, and means for supplying an inert plasma gas to the annular body portion which flows around the cathode and exits the anode nozzle opening. The pilot plasma guns are in one embodiment angularly displaced symmetrically about a common axis, such that the plasmas generated by the pilot plasma guns intersect the common axis.

The individual plasmas generated by the pilot plasma guns are extended and electromagnetically coalesced into a free-standing plasma by means of a transferred current established to the main transfer electrode, preferably an annular anode having a nozzle bore coaxially aligned with the common axis, such that the plasmas generated by the pilot plasma guns are directed into the nozzle bore of the main transfer anode. The pilot plasmas are generated in the disclosed embodiment by a conventional direct current power means connected to the rod-shaped cathodes and the annular anodes, forming an electric arc through which the inert plasma gas flows, ionizing the gas and forming a plurality of plasmas which intersect in the throat of the main transfer anode. In the disclosed embodiment, the throat of the main transfer anode is preferably cone-shaped to receive and direct the individual plasmas generated by the pilot plasma guns into the nozzle bore of the main transfer anode.

The power means in one disclosed embodiment further includes a source of direct current connected to the cathodes of the pilot plasma guns and the main transfer anode establishes a transferred current which electromagnetically coalesces the pilot plasmas, forming a free-standing coalesced plasma in the main transfer electrode bore, through which the feedstock is fed.

In the most preferred embodiment of the plasma generating apparatus and method of this invention, a second ionizable plasma gas is fed into the throat of the main transfer electrode and ionized, extending the free-standing plasma and adding to the heat generated and transferred tot he feedstock. Although the second plasma gas may be an inert plasma gas or the same plasma gas used in the pilot plasma guns, the second plasma gas is more preferably a reactive plasma gas or a reactive gas mixture in certain applications, adding to the energy generated by the free-standing plasma when ionized and providing the advantages described above. Thus, the plasma spray apparatus of this invention is capable of including any suitable ionizable gas as the plasma gas, depending upon the requirements of the particular application. The second plasma gas may be supplied to the bore of the main transfer electrode or anode axially, or more preferably tangentially, forming a vortex of plasma gas in the anode bore, constricting the electromagnetically coalesced free-standing plasma.

As described, the feedstock may then be fed axially through the common axis of the pilot plasma guns, resulting in a true axial feed plasma spray apparatus. In the disclosed embodiment of the plasma spray apparatus of this invention, powdered or particulate feedstock is fed through a feedstock supply tube extending through the common axis of the pilot plasma guns to the point of intersection of the pilot plasmas in the throat of the main transfer electrode. Alternatively, the feedstock may be supplied to the nozzle bore of the main transfer electrode in the form of a wire or rod. The feedstock is then fed through the intersection of the pilot plasmas into the free-standing plasma in the main transfer electrode bore, uniformly heating and accelerating the feedstock and improving the deposition efficiency of the system. Still, alternatively, the feedstock may be in liquid form, such as a solution, a slurry or a sol-gel fluid, such that the liquid carrier will be vaporized or reacted off, leaving a solid material to be deposited.

The plasma generating apparatus and method of this invention thus eliminates the long-standing problems with radial feed plasma spray apparatus. Because the feedstock is fed axially through the plasma spray apparatus of this invention, deposition efficiency is improved and a greater range of particle sizes may be used, reducing the cost of the feedstock. Further, various blends of particulate feedstock may be utilized, including blends of particles dissimilar in size and density. Furthermore, much larger particles than are normally employed in commercial plasma spraying may be used due to the extended residence time in the hot zone. Further, reactive gases, including oxygen and blends of reactive gases including oxygen, may be used as the main plasma gas in the plasma spray apparatus of this invention, increasing the range of applications for the plasma spray apparatus of this invention. Finally, the operating power level of the plasma spray apparatus of this invention may be increased by increasing the plasma voltage, rather than the current, and selecting the plasma-forming gas utilized.

In still another aspect, the pilot plasma guns utilized in the present invention are arranged with their longitudinal axes parallel to the longitudinal axis of the feedstock supply bore. The pilot plasma streams are caused to intersect at a common point within the main anode by deflecting the individual streams through an angular channel at the terminal portion of each individual pilot plasma anode nozzle. This streamline configuration facilitates coolant passage design and provides a more compact plasma spray apparatus in which the point of intersection of the individual pilot plasma streams is more precisely controlled.

In still another aspect, the plasma spray apparatus of the present invention is operated by a four power supply system with a single high frequency oscillator. This electrical configuration eliminates the need for additional power supplies and permits start up using a single switch.

Other advantages and meritorious features of the plasma generating apparatus and method of this invention will be more fully understood from the following detailed description of the preferred embodiments, the appended claims and the drawings, a brief description of which follows.

DESCRIPTION OF THE PREFERRED EMBODIMENT

Figure 1:
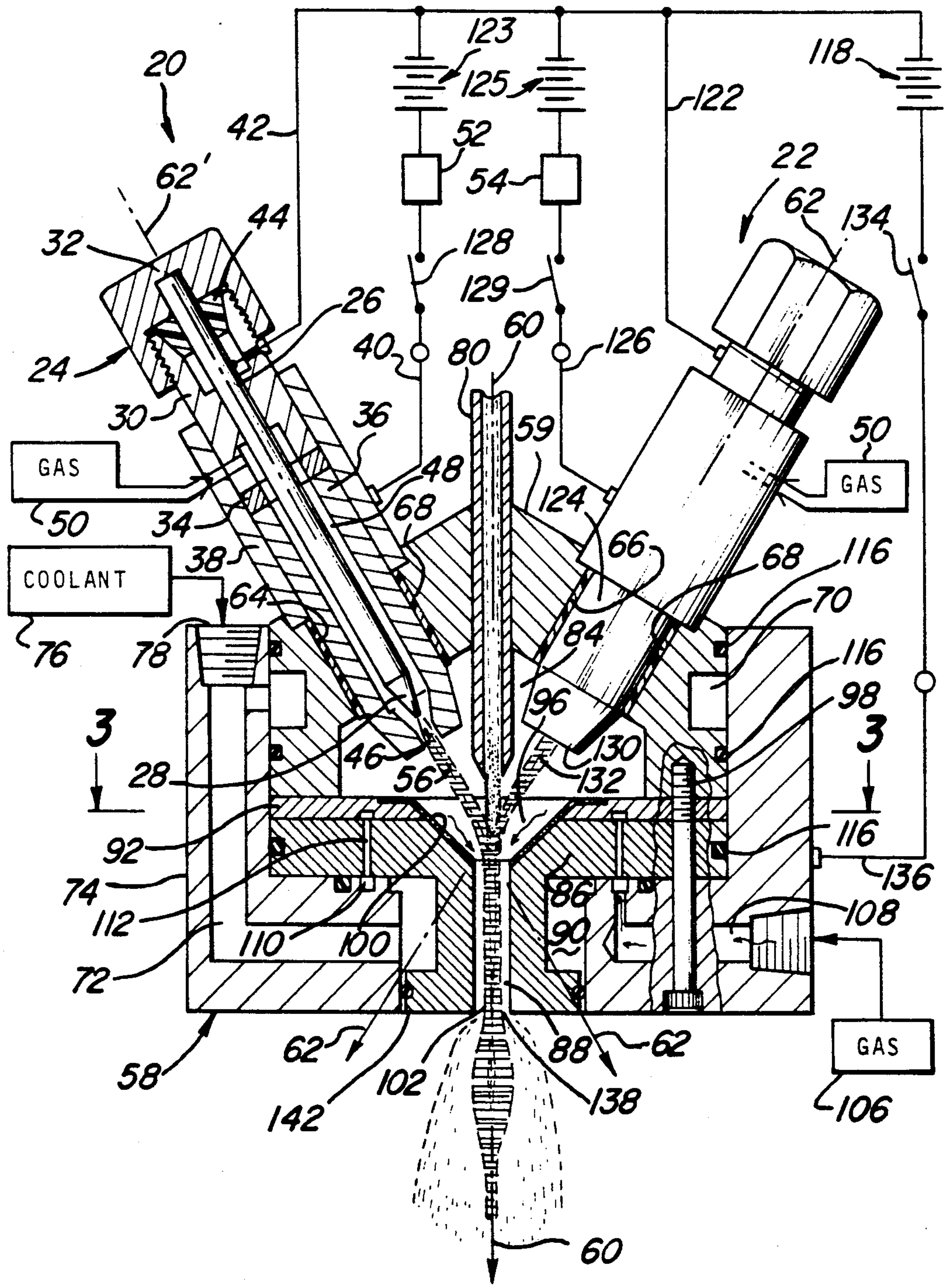
FIG. 1 is a front elevational view of the plasma spray apparatus of the present invention in partial cross-section.

Referring now to FIG. 1 of the drawings, plasma spray apparatus 20 is shown generally in one embodiment having first pilot plasma gun 22 and second plasma gun 24, the latter being shown partially in cross-section. Pilot plasma guns 22 and 24 are of the conventional type in which a centrally disposed, rod-shaped cathode 26 is provided having a cone-shaped free end 28. Rod-shaped cathode 26 is secured in position by frictional engagement with retainer 30, one end of which is closed by closely fitting cap 32. As will be appreciated by those skilled in the art, cap 32 may be threaded onto retainer 30 such that rod-shaped cathode 26 can be replaced when worn. However, as will be more fully described hereinafter, in the present invention, the unique construction of the present invention may often reduce cathode wear so that replacement is less frequent. A ring of dielectric material such as a ceramic insulator 34 is provided to electrically isolate rod-shaped cathode 26 and its retaining structures form annular anode 36.

Annular anode 36 is secured in place by electrically insulating sheath 38 through which electrical lead 40 extends to make electrical contact with annular anode 36. Similarly, electrical lead 42 extends through retainer 30 making electrical contact with rod-shaped cathode 26. Annular anode 36 is provided with nozzle opening 46 through which a pilot plasma is directed during start-up of plasma spray apparatus 20.

In some applications, rod-shaped cathode 26 will include internal passages through which a cooling medium such as water may be circulated to dissipate heat from rod-shaped cathode 26 developed during plasma operation. A similar heat exchange channel (not shown) is also preferably provided in annular anode 36 for the purpose of dissipating the extreme heat generated by the pilot plasma stream. Annular space 48 defined between the inner surface or wall of annular anode 36 and rod-shaped cathode 26 comprises a portion of a plasma gas passage which extends from plasma gas source 50 through a channel in insulating sheath 38 and retainer 30. As illustrated, retainer 30 includes a portion which is spaced slightly from rod-shaped cathode 26 to permit the flow of plasma gas through a similar annular space provided by ceramic insulator 34 into annular space 48. Hence, when the appropriate electrical potentials are applied to rod-shaped cathode 26 and annular anode 36, and an electric arc is established via high frequency oscillator 52 (another high frequency oscillator 54 is provided in the electrical circuit for pilot plasma gun 22) which extends from cone-shaped end 28 of rod-shaped cathode 26 to annular anode 36.

As plasma gas is then flowed from plasma gas source 50 through annular space 48, the plasma gas encounters the electric arc which ionizes the plasma gas in the known manner, forming pilot plasma stream 56. Pilot plasma stream 56 emerges from nozzle opening 46. It is to be understood that the term "plasma gas" as used herein shall be defined as any gas or mixture of gases which ionizes when passing through an electric arc of suitable electrical characteristics. As will be understood more fully hereinafter, a significant feature of the present invention is that it permits a final, coalesced freestanding plasma stream to be formed which includes an active or reactive gas such as oxygen without causing accelerated deterioration of rod-shaped cathode 26. However, for operating pilot plasma guns 22 and 24, an inert gas, preferably argon, is used as the plasma gas. Other suitable plasma gases will be known to those skilled in the art.

Figure 5:
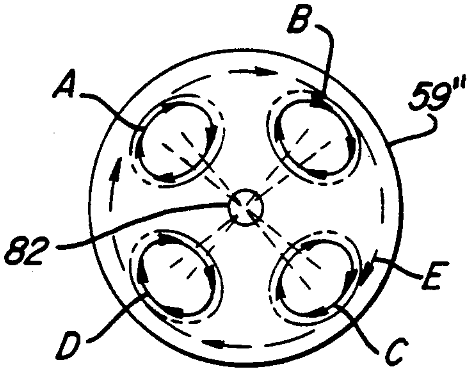
FIG. 5 is a top view of a support block adapted to receive four pilot plasma guns in the present invention with magnetic field lines shown schematically.
Figure 8:
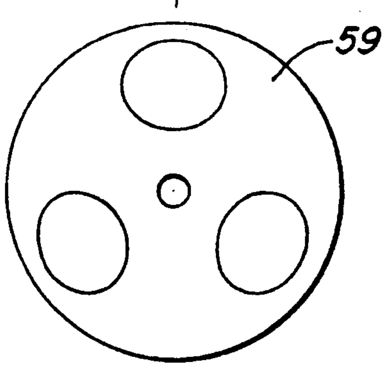
FIG. 8 is an alternative support block adapted to receive three pilot plasma guns.

Pilot plasma guns 22 and 24 are mounted in housing 58 at support block 59 such that they are displaced symmetrically about a common axis 60. As will be explained more fully hereinafter, although in this particular embodiment only two pilot plasma guns (22 and 24) are provided, it is preferred that plasma spray apparatus 20 be equipped with three pilot plasma guns in block 59' as shown in FIG. 8 or four plasma pilot guns in block 59'' as shown in FIG. 5 of the drawings. In each case, the pilot plasma guns may be symmetrically arranged about common axis 60 with each pilot plasma gun axes (62 and 62' in FIG. 1) intersecting at an included angle of preferably less than about 60 degrees. In other words, the included angle between axis 62 and axis 60 is preferably less than about 30 degrees as is the included angle between axis 62' and axis 60.

Figure 4:
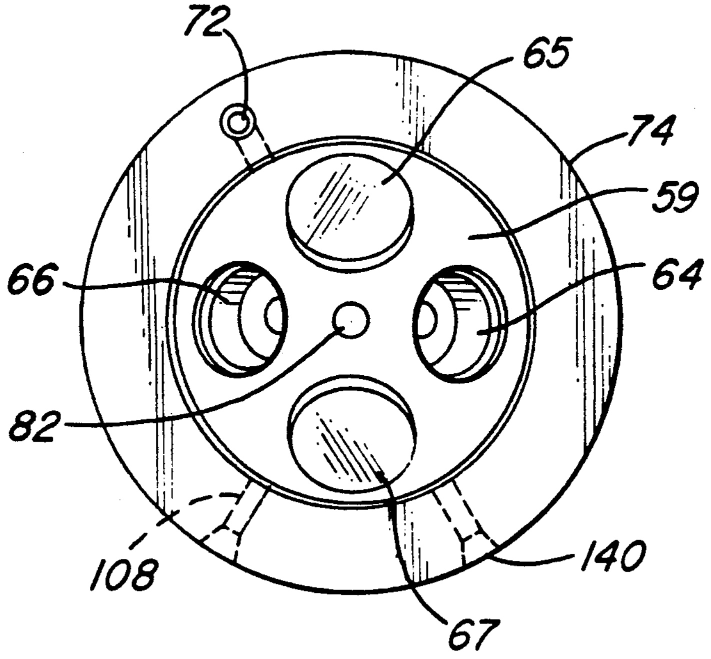
FIG. 4 is a top view of the housing of the present invention.

Bores 64 and 66 in block 59 closely receive, respectively, pilot plasma gun 22 and 24 in rigid engagement. In this embodiment, and referring again to FIG. I of the drawings, block 59 is countersunk at bores 64 and 66 to provide a shoulder or rim on which insulating sheath 38 abuts. Further, a dieletric ferrule 68 is provided as a sheath surrounding a portion of annular anode 36 to electrically insulate annular anode 36 from block 59. A polyester material is suitable for this purpose. Block 59 may be formed of any readily machinable metal such as brass. As shown in FIG. 4, block 59 may be machined with four bores, two of which are plugged with plugs 65 and 67. Thus, block 59 can be easily adapted for 2 or 4 pilot plasma guns. It will also be understood that block 59'' shown in FIG. 5 includes two additional bores for two additional pilot plasma guns (now shown). In this four-part configuration, each bore is spaced 90 degrees from each adjacent bore. In FIG. 8, block 59' is adapted to receive three pilot plasma guns spaced 120 degrees apart. In both arrangements, the bores are configured to support the pilot plasma guns angularly, preferably about 30 degrees or less off center axis 60. Symmetry of the plasma streams is important to provide a stable intersection of the pilot plasma streams.

Block 59 is provided with annular heat exchange chamber 70 which is in flow communication with heat exchange passage 72 of jacket 74. In this manner, coolant 76 is flowed during operation through port 78 into heat exchange passage 72 whereby it is circulated through annular heat exchange chamber 70 to cool block 59. Where, as in the preferred embodiment, more than two pilot plasma guns are employed, additional bores may be provided symmetrically in block 59 as previously described.

Figure 2:
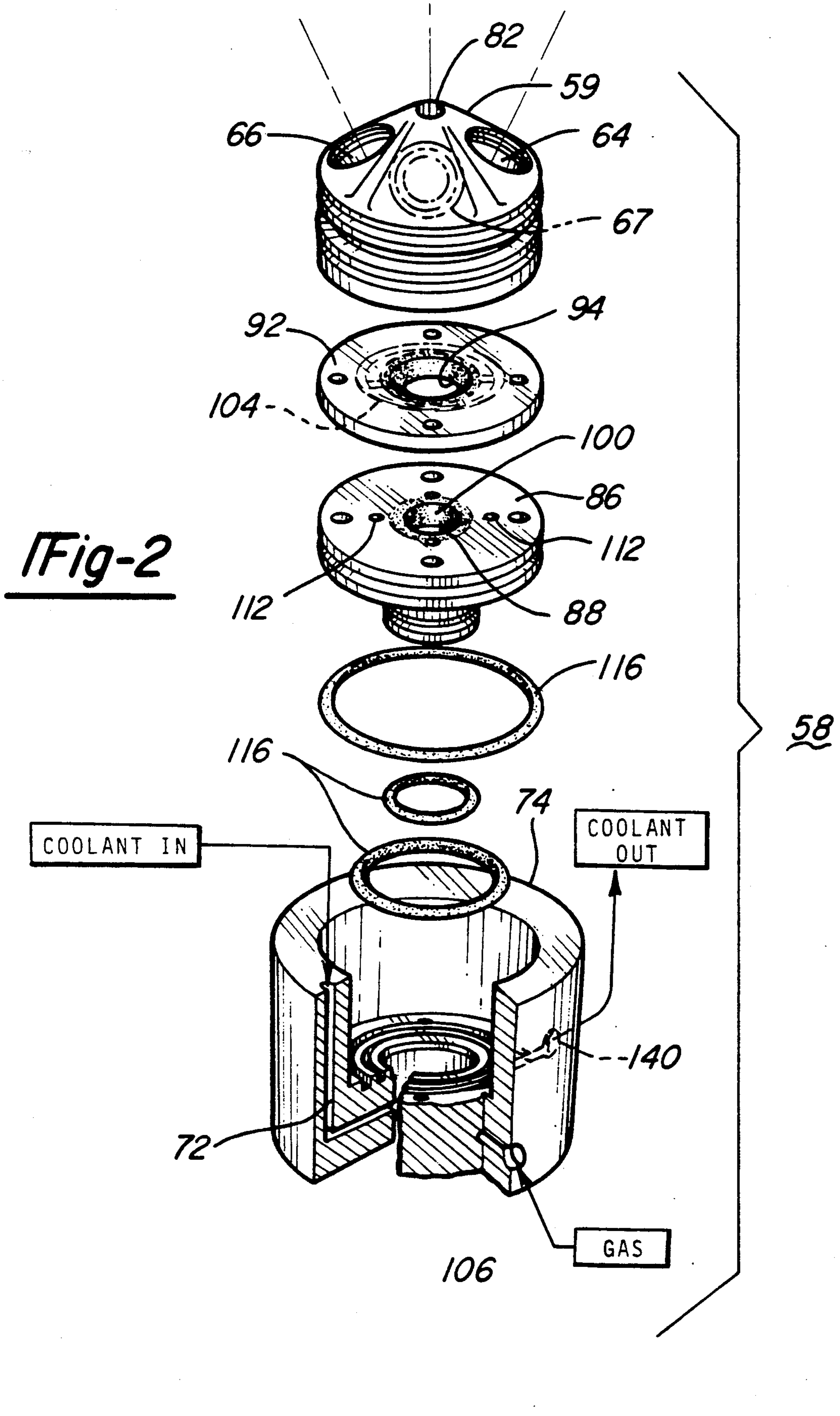
FIG. 2 is an exploded perspective view of the housing of the present invention.

Referring now to FIGS. 1 and 2 of the drawings, in order to provide feedstock axially along axis 60, feedstock supply tube 80 is provided disposed in block 59 at bore 82. Feedstock supply tube 80 is closely received within bore 82 in frictional engagement with block 59. Feedstock supply tube 80 is open at its terminal end which extends into chamber 84 of block 59 and provides the means by which a feedstock material, such as a particulate composition is delivered to the plasma along axis 60. As will be more fully explained, a solid feedstock in the form of a rod or the like may be suitable in some applications. Also, it will be noted that pilot plasma guns 22 and 24 extend into chamber 84 at their nozzle opening ends.

Housing 58 further includes main transfer anode 86 having a central bore or passage 88 extending the length thereof. Main transfer anode 86 is formed of an electrically conductive material such as copper and includes an annular channel 90 through which a coolant is circulated via heat exchange passage 72. In other words, annular channel 90 and heat exchange passage 72 are in flow communication. In this particular embodiment, disc 92 is provided interposed between block 59 and main transfer anode 86. As will become apparent, this configuration permits easy fabrication and assembly. Disc 92 has a centrally disposed bore 94 which is conical in shape and which mates with main transfer anode 86 at a corresponding conical portion of bore 88. In this manner, conical throat 96 is defined in which axes 62 and 62′ intersect. The included angle of conical throat 96 will typically be approximately 60 degrees or correspond to the angle of impingement of the pilot guns. Conical throat 96 and bore 88 are in axial alignment with axis 60. It will also be noted that in this embodiment main transfer anode 86, disc 92, and block 59 are secured in position in jacket 74 with bolt 98. As will become more apparent during the description of the operation of plasma spray apparatus 20, it is preferable to coat conical throat 96 and a portion of disc 92 with a layer of dielectric material 100 such as aluminum oxide. In addition to reducing erosion of the surfaces defining conical throat 96, dielectric layer 100 serves to extend the length of main transferred plasma-arc or free-standing plasma 102 by preventing the contacting of the coalesced plasma stream until after it enters the bore of the main transfer anode. The significant advantages of extending free-standing plasma 102 in this manner will be described in detail in connection with the description of the method of the present invention.

Figure 3:
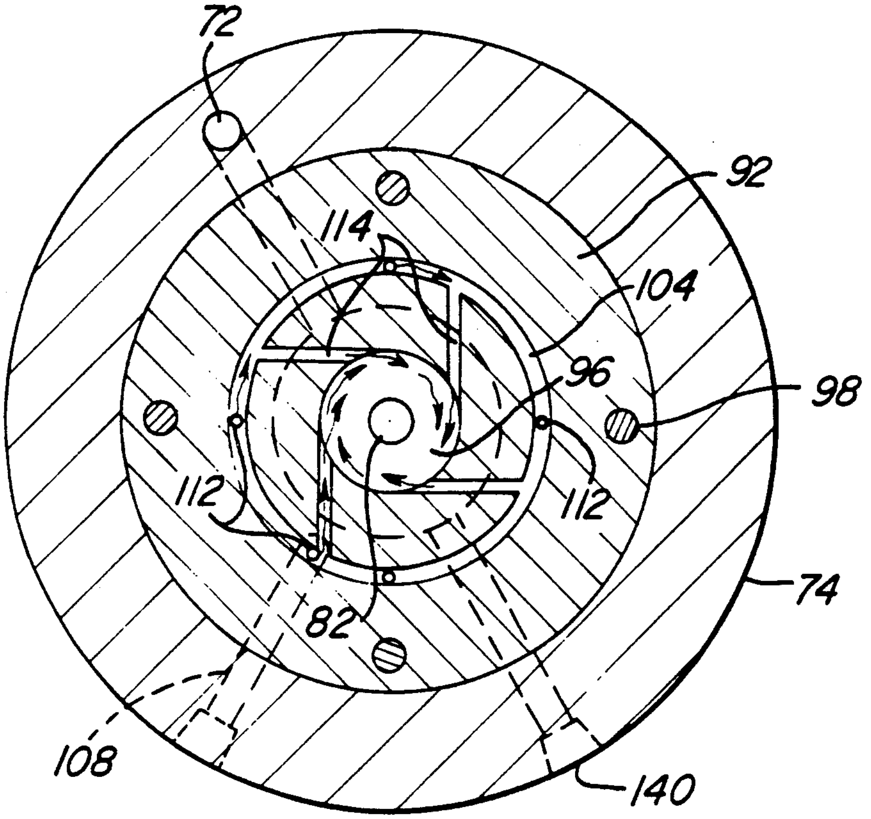
FIG. 3 is a plan view of a section taken along lines 3-3 of FIG. 1.

Main transfer anode is formed of a highly conductive material such as a copper alloy or the like. Disc 92 may be formed of a durable metal or a refractory oxide. As shown best in FIG. 3 of the drawings, in this embodiment of the invention disc 92 serves as a gas manifold having a network of channels or gas passages. In this regard, annular gas channel 104 is shown adapted to receive a plasma-forming gas from plasma gas source 106 as illustrated in FIG. 1. Referring to FIGS. 2 and 3, plasma gas moves from gas source 106 through passage 108 which is a bore extending through jacket 74 of housing 58. In flow communication with passage 108, a second annular gas passage 110 is provided in jacket 74. Main transfer anode 86 also has a plurality of microbores 112 which are in flow communication with annular gas passage 110 and with annular gas channel 104.

In flow communication with annular gas channel 104, a plurality of tangential gas passages I 14 are provided which facilitate the introduction of plasma gas from a secondary plasma gas source 106 into conical throat 96 in a spinning or whirling manner. Although a path of introduction more direct than that provided by the tangential geometry of gas passages 114 may be suitable, by flowing plasma gas into conical throat 96 in the preferred manner, the whirling motion of the plasma gas which is imparted creates a plasma vortex within passage 88. This vortex helps constrict free standing plasma 102 along with other factors, such that is a highly-collimated stream. It should be noted that the gas manifold can be provided in a similar manner directly in main transfer anode 86. A plurality of O-rings 116 are also provided which conform to annular channels in the various structures of housing 58 such that substantially hermetic seals are attained.

Numerous variations and modifications of plasma spray apparatus 20 will be apparent which are consistent with the principles of the present invention. For example, in most applications housing 58 will be encased in an electrically insulating material. Also, plasma spray apparatus 20 may be adapted to permit robotically controlled spraying or hand-held spraying. Further, although plasma spray apparatus 20 is illustrated having two, three or four symmetrically disposed pilot plasma guns, five or more pilot plasma guns may be suitable or desirable in a particular application.

In operation, and in accordance with the method of the present invention, plasma spray apparatus 20 is preferably utilized to apply a sprayed coating of a material such as a metal or ceramic to a target substrate. Other applications such as the processing of materials and the production of free-standing articles including near-net shapes are also preferred herein. Plasma spray apparatus 20 may also be suitable for use in high-temperature cutting or heating operations.

Referring again to FIGS. 1 and 2, rod-shaped cathode 26 of pilot plasma gun 24 is electrically connected to the negative terminal of an electrical power source 118 via lead 42. In the same fashion, the rod-shaped cathode (not shown) of pilot plasma gun 22 is connected to the negative terminal of power source 118 with electrical lead 122. Annular anode 36 of pilot plasma gun 24 is electrically connected to the positive terminal of power source 123 via lead 40. Annular anode 124 of pilot plasma gun 22 is electrically connected to the positive terminal of power source 125 by lead 126. All power sources in the present invention preferably provide direct current. As previously stated, a first high frequency oscillator 52 and a second high frequency oscillator 54 are provided in the circuit for initiating an electric arc or "pilot arc" between each pilot plasma gun cathode and its respective annular anode. That is, high frequency oscillators 52 and 54 serve to initiate an electric arc between rod-shaped cathode 26 and annular anode 36 of pilot plasma gun 24 and, in pilot plasma gun 22, between annular anode 124 and its corresponding rod-shaped cathode (not shown).

Figure 6:
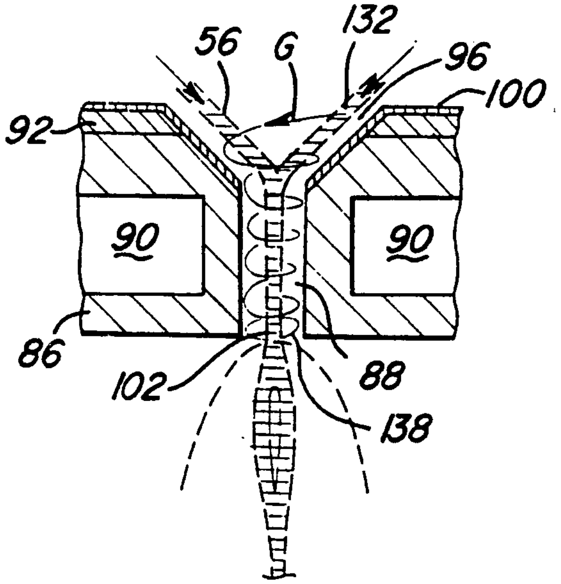
FIG. 6 is a front elevational view of a portion of the main transfer anode and disc of the present invention with plasma streams shown diagrammatically.
Figure 9:
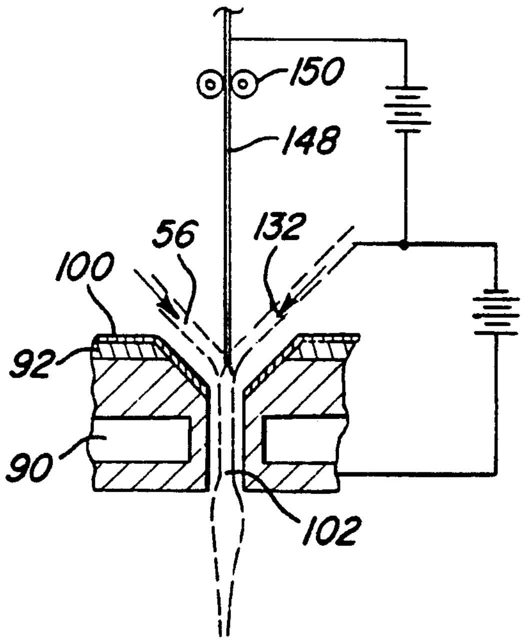
FIG. 9 is a front elevational view of a portion of the main transfer anode and disc of the present invention in another embodiment in which a wire feedstock is fed to intersecting plasmas.

During start-up a first plasma gas, such as argon, is flowed from plasma gas source 50 into annular space 48 and outwardly through nozzle opening 46 of pilot plasma gun 24. Plasma gas flow is initiated in pilot plasma gun 22 in the same manner. Switches 128 and 129 are then closed momentarily, activating high-frequency oscillators 52 and 54 and simultaneously connecting power sources 123 and 125 to pilot plasma guns 24 and 22, respectively, thereby initiating and establishing pilot arcs in the pilot plasma guns. A steady direct current maintains the electric arcs. As plasma gas flows toward nozzle openings 46 and 130 of pilot plasma guns 22 and 24, preferably under pressure, it passes through the pilot arcs causing the plasma gas to ionize in the known manner. The plasma gas may be introduced axially or, alternatively, "whirling" to form a vortex if desired. Non-transferred pilot plasma streams 56 and 132 are thus formed which intersect in conical throat 96 as shown also in FIGS. 6 and 9. Switch 134 is then closed electrically energizing main transfer anode 86.

As will be appreciated by those skilled in the art, and as will be more fully explained hereinafter, the electromagnetic fields which are associated with charges in motion provide forces that affect the interaction of pilot plasma streams 56 and 132 at their point of intersection and the characteristics of free-standing plasma 102.

Moreover, as main transfer anode 86 is energized, the electromagnetically coalescing pilot plasma streams 56 and 132 in conical throat 96 are drawn through conical throat 96 into the straight bore portion of passage 88. This occurs because the intersecting pilot plasma streams have the properties of a "flexible conductor" and thus generate electromagnetic fields which cause the plasmas to be attracted to one another, causing the plasmas to coalesce in conical throat 96. The intersecting streams are drawn toward the positive charge of main transfer anode 86 which is in electrical connection with power source 118 at its positive terminal via lead 136. (It will be noted that in this embodiment, jacket 74 is in electrical connection with main transfer anode 86. Other arrangements may be suitable.)

By providing dielectric layer 100 in conical throat 96, in the preferred embodiment, the coalescing pilot plasma streams 56 and 132 move toward the exposed surfaces of main transfer anode 86 in the straight bore position of passage 88. Dielectric layer 100 prevents pilot plasma streams 56 and 132 from "short-circuiting" with main transfer anode 86 or disc 92 prior to electromagnetically coalescing. Also, in this manner, the electromagnetically coalesced plasma stream is extended into the straight bore portion of main transfer anode 86. By lengthening the plasma in this fashion, the plasma voltage is increased, producing an increase in the plasma energy density. High plasma energy densities are desirable because they facilitate thermal energy transfer to the feedstock and increase particle velocities.

A second or main plasma gas from plasma gas source 106 is flowed under pressure into conical throat 96 via passage 108, annular gas passage 110, microbores 112 and tangential gas passages 114, the latter of which, as stated, opens into conical throat 96. While it is preferred that an inert ionizable, plasma-forming gas be employed in forming pilot plasma streams 56 and 132 to prevent accelerated deterioration of the rod-shaped cathodes, a significant advantage of the present invention is the ability to form a plasma stream which includes an active or "reactive" ga such as oxygen which is detrimental to the cathode material. This is made possible by the present invention since an inert gas can be used in pilot plasma guns 22 and 24, thus protecting the rod-shaped cathodes, and an active gas then introduced downstream of the pilot plasma guns at conical throat 96. The use of a reactive gas may be desirable to alter the chemical composition of the feedstock as it is sprayed and also permits higher operating voltages, since the latter is a function of the composition of the plasma gas.

As plasma gas is flowed from tangential gas passages 114, it creates a vortex which further serves to collimate free-standing plasma 102. The spin of the secondary plasma-forming gas is illustrated best in FIG. 6 of the drawings as arrow G. As secondary plasma gas enters conical throat 96, it is ionized by the electrically energetic converging pilot plasma streams 56 and 132. The resulting hot, whirling rapidly-expanding plasma gases combine with pilot plasma streams 56 and 132 and, through the forces due to the expansion of hot gases and electromagnetic influences, the plasma is drawn into the straight bore portion of passage 88, forming free-standing plasma 102 which emerges at a high velocity from plasma discharge opening 138. The tightly constricted free-standing plasma 102 makes electrical contact with main transfer anode 86 to complete the circuit. This occurs near plasma discharge anode 86. After start-up is completed, switches 128 and 129 of FIG. 1 may be opened such that the annular anodes of the pilot plasma guns are disconnected from the circuit. Pilot plasma streams 56 and 132 continue to flow into conical throat 96 because they are electrically linked to main transfer anode 86 via free-standing plasma 102 which is maintained by a steady direct current.

It will be appreciated by those skilled in the art that one of the significant advantages of plasma spray guns in general is their ability to generate high temperatures, often exceeding 12,000 degrees K. These high temperatures make plasma spraying ideal for processing and spraying refractory oxides and other heat-resistant materials. To prevent thermal deterioration of the various parts of plasma spray apparatus 20, and referring now to FIGS. 1 and 2 of the drawings, coolant is circulated through housing 58 in the coolant passages previously described. Coolant is removed at coolant exit 140. By cooling main transfer anode 86 at the straight bore portion of passage 88, the regions of passage 88 immediately adjacent the interior walls of main transfer anode 86 are cooled, producing a phenomenon known as "thermal pinch". Accordingly, a sheath of cooler, non-ionized gas is maintained near the walls of main transfer anode 86. This non-conductive sheath constricts the electric field lines of free-standing plasma 102 serving to further concentrate or constrict the plasma stream.

Figure 7:
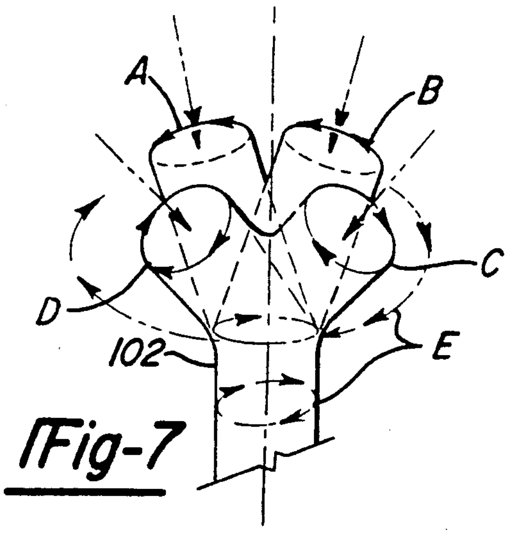
FIG. 7 is a diagrammatic perspective representation of the magnetic field lines coalescing the plasma streams.

A magnetic pinch is also provided which will now be explained. Pilot plasma streams 56 and 132 converge symmetrically at the intersection of axes 60, 62 and 62', as shown in FIG. 1. Pilot plasma streams 56 and 132 (and any additional pilot plasma streams where more than two symmetrically disposed pilot plasma guns are utilized) deflect uniformly at the point of intersection. The uniform deflection is brought about in this embodiment in part by the kinetic interacting forces of the intersecting plasmas and the symmetrical geometry. Further, each pilot plasma stream has an associated circumferential magnetic field, induced by the transferred DC electric current between each of the cathode of the pilot plasma guns and the main transfer anode, illustrated by arrows A, B, C, and D in FIGS. 5 and 7. In addition, a magnetic field E is present which encircles the converging pilot plasma streams. Due to the superposition of the various magnetic vector components, magnetic field E serves to draw the individual plasma streams together as shown best in FIG. 7. The magnitude of this constricting magnetic pinch increases adjacent the point of intersection of the pilot plasma streams. This increasing magnetic pinch causes the individual pilot plasma streams to electromagnetically coalesce to form a stable coalesced plasma stream. The magnetic pinch increases the pressure, temperature and velocity of free-standing plasma 102. The magnitude of this magnetic pinch is proportional to the combined current conducted by the pilot plasma streams and free-standing plasma 102.

After free-standing plasma 102 is fully established, a feedstock material is supplied to the point of intersection of the pilot plasmas. Referring again to FIG. 1 of the drawings, in one embodiment a particulate feedstock is injected through feedstock supply tube 80 which, as stated, is in axial alignment with axis 60. It is a significant advantage of the present invention that axial injection of feedstock can be achieved without disturbing the plasma arc. This is made possible in this embodiment by the angular arrangement of pilot plasma guns 22 and 24. The disadvantages of radial feed in prior art plasma spray apparatus are thus obviated by the present invention. Thus, the present invention provides uniform heating of the axially injected feedstock particles. Particle velocity is also extremely uniform. Supersonic particle velocities may be achieved. In most instances, the feedstock will be injected under pressure through the use of an inert carrier gas. By controlling the various operating parameters of plasma spray apparatus 20, including particle injection velocity, precise control over particle velocity and temperature can be achieved. Hence as feedstock enters the electromagnetically coalescing pilot plasma streams, it is entrained and accelerated in free-standing plasma 102 at its region of highest enthalpy. The heated, high-velocity particles are directed toward a target substrate which they impact to form a dense, uniform deposit. High deposition efficiencies are thereby achieved. Ceramics, such as refractory oxides, metals and even polymers may be sprayed in this manner. One particularly preferred application is the fabrication of metal and ceramic matrix composites.

Other methods of axially injecting feedstock in the present invention are also suitable, including fluid feed of materials such as slurries, solutions and sol-gel fluids, or the use of feedstock in the form of wires or rods. In particular, and referring now to FIG. 9 of the drawings, in one embodiment of the present invention, the feedstock comprises rod 148 which is advanced by rollers 150 into the intersecting pilot plasma streams 56 and 132. Because pilot plasma streams 56 and 132 are electrically energized at their point of intersection, by applying an opposite electrical bias to rod 148, rod 148 becomes an electrode which may form an arc with the intersecting pilot plasmas. This electric feedstock arc and the heat generated by the intersecting pilot plasmas rapidly melts the tip of advancing rod 148. The molten feedstock is atomized by the intersecting pilot plasmas and moves into free-standing plasma 102 in the manner previously described.

It is an important advantage of the present invention that exceptionally high power levels can be obtained with plasma spray apparatus 20. Operating powers of 100 kw or greater for the cathode to main transfer anode circuit may be continuously sustained. After start-up, a steady direct current of from about 75 to about 125 amps and a voltage of about 100 to 200 volts between each rod-shaped cathode and main transfer anode 86 is established. The preferred voltage of the pilot plasma guns is from about 15 to about 30 volts. The preferred current is from about 10 to 30 amps. Hence, free-standing plasma 102 may be energized at voltages form about 10 to about 50 times higher than the combined power of the individual pilot plasma guns. It will be appreciated by those skilled in the art that an increase in plasma arc voltage increase the energy of the plasma stream.

Figure 10:
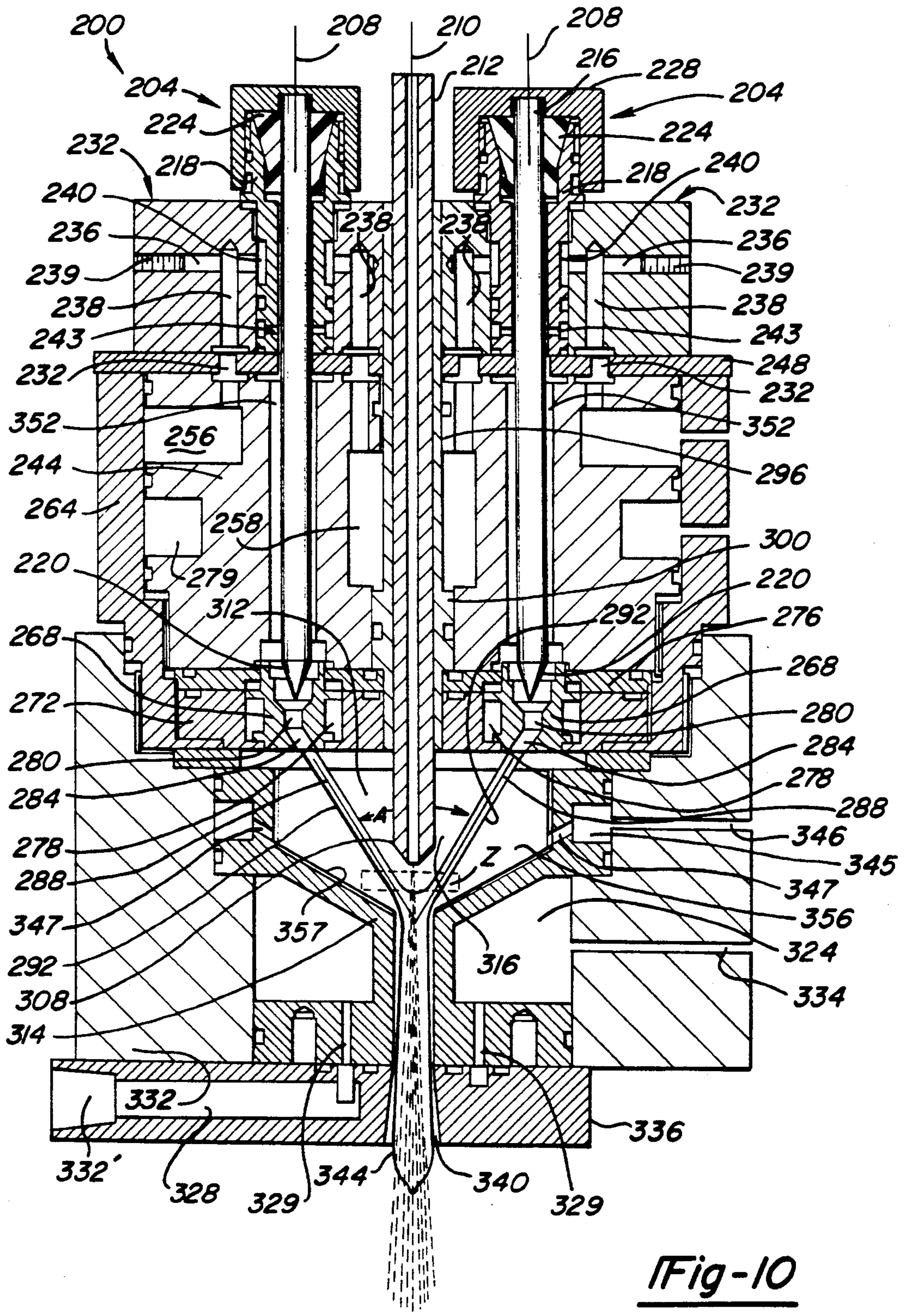
FIG. 10 is a front elevational view of the plasma spray apparatus of the present invention in cross section in another embodiment.

In still another embodiment of the present invention and referring now to FIGS. 10 ad 11 of the drawings, the individual pilot plasma guns are arranged such that they are substantially parallel to one another and parallel to the centrally disposed feedstock supply tube. More specifically, plasma spray apparatus 200 is shown having a plurality of pilot plasma guns 204. In the most preferred embodiment, four pilot plasma guns 204 are provided at positions A, B, C, and D of FIG. 11. The longitudinal axes 208 of pilot plasma guns 204 are generally parallel to one another and to axis 210 of feedstock supply tube 212.

In contrast to the angularly displaced pilot plasma guns described in the foregoing embodiments, the substantially parallel alignment described in connection with this embodiment achieves a number of advantages. In general, it has been found that for optimum performance the pilot plasma guns should be accurately aligned so that the individual plasma streams intersect substantially at a common point. In those embodiments in which the pilot plasma torches are angularly displaced, it is somewhat difficult to achieve and maintain precise alignment of the individual plasma streams due o the large number of components and the resulting cumulative tolerances associated with the plasma spray apparatus. In addition, angularly displaced pilot plasma guns contribute to an overall bulky design which in many instances may be less desirable in a commercial context than the more compact design shown in FIGS. 10 and 11 of the drawings.

Accordingly, parallel pilot plasma guns 204 are shown each equipped with a centrally disposed, rod shaped cathode 216 having a cone shaped free end 220. Each rod shaped cathode 216 is secured in position in cathode support housing 218 by frictional engagement with retainer 224. Each cathode support housing 218 is closed by a closely fitting cap 228 which is releasably engaged to facilitate easy removal of cathode 216 in the event replacement is necessary.

In this embodiment of the invention, cathode support housings 218 are mounted in generally triangular-shaped blocks 232, each block 232 having channels 236 and 238 (the latter being blocked at one end by plug 239) in communication with annular coolant passage 240. Annular coolant passages 240 extend around each cathode support housing 218. As shown only in FIG. 11, blocks 232 also include primary plasma-forming gas supply channels 241 which connect gas ports 242 with the bore of cathode support housing 218 via passages 243. Each block 232 is electrically isolated from pilot plasma gun body 244 by a layer of dielectric 248. A plurality of openings 232 are provided through layer 248 such that channels 238 of blocks 232 are in flow communication with annular coolant chambers 256 and 258 of pilot plasma gun body 244 which is shown mounted in housing 264.

Each pilot plasma gun 204 has an annular anode or nozzle 268 which is held in position by annular retaining body 272 and plate 276. Anodes 268, retaining body 272 and plate 276 will generally be bonded together to form a unitary body. Annular coolant passages 278 are thus defined surrounding annular anodes 268 which are in flow communication with chambers 256 and chambers 279 of pilot plasma gun body 244 by passages (not shown).

An important feature of the parallel pilot plasma gun design is the configuration of the nozzle channel or bore 280 of anodes 268. As shown in FIG. 10 of the drawings, the terminal outlet portion 284 of bore 280 is formed at an angle such that an axis 288 is defined for each pilot plasma stream 292. Thus, annular anodes 268 define channels 280 through which plasma streams 292 are deflected so that the multiple pilot plasma streams converge together at a common point.

In this particular embodiment, and as shown in FIG. 10 of the drawings, feedstock supply tube 212 is mounted in sheath 296, the latter having an expanded portion 300 which is secured within pilot plasma gun body 244 at plate 276. Feedstock supply tube 212 can be easily removed when replacement is necessary. End 308 of feedstock supply tube 212 extends into chamber 312 which is defined by main transfer anode 314. A particulate feedstock 316 is shown exiting bore 320 of feedstock supply tube 212 along axis 210.

Main transfer anode 314 is mounted within electrically insulating support 332 which in turn is connected to housing 264. In order to cool main transfer anode 314 during operation of plasma spray apparatus 200, an annular heat exchange jacket or chamber 324 is provided through which coolant flows via channels 328 and 329 from coolant inlet 332. Coolant exits jacket 324 through outlet channel 334. Coolant inlet 332 is defined by nozzle plate 336 which includes divergent nozzle opening 340 through which combined plasma stream 344 exits. In order to supply a second plasma-forming gas to chamber 312, an annular gas manifold 345 is provided in main transfer anode 314. Gas is supplied to manifold 345 via channel 346 and enters chamber 312 through passages 347 tangentially to preferably form a vortex as previously described in connection with the foregoing embodiments.

In operation, a first plasma forming gas is introduced into each pilot plasma gun 204 by way of channels 241, 242 and passages 243. The plasma forming gas flows along cathodes 216 in annular spaces 352. As the plasma forming gas passes between the cone shaped free end 220 of each cathode 216 at annular anode 268, individual gas plasma streams are formed by an electrical discharge in the known manner which are then deflected to the appropriate angle in terminal outlet portion 284 of bore 280. The angle of deflection is such that the individual pilot plasma streams intersect at a common point in conical throat region 356 of main transfer anode 314. As in the previously described embodiments, a secondary plasma-forming gas is introduced into conical throat portion 356 via passages 347 preferably such that a vortex of secondary plasma-forming gas is formed. The electric current in pilot plasma streams 292 serves to assist in coalescing them. The secondary gas is then ionized to form a plasma as previously described. Again, a layer of dielectric 357 is provided on main transfer anode 314.

The electromagnetic interactions which result in the formation of coalesced plasma 344 are the same as that previously described. In addition, it is to be noted that in all of the embodiments of the present invention, the included angle between intersecting pilot plasma streams 292 (angle A in FIG. 10) is an important parameter in maintaining the proper electromagnetic coalescing of the intersecting streams. Typically, the upper level of the transferred arc current per plasma stream will be about 200 amperes. In order to promote electromagnetic coalescing of the intersecting pilot plasma streams at these current levels, a strong intersection of the electromagnetic fields surrounding each of the plasma streams is required. For currents under 200 amperes, an even closer physical relationship of the streams is required in order to obtain the necessary interaction of the electromagnetic fields to produce coalescing of the streams. It has been found that included angles below 60° are generally most useful and that included angles exceeding 80° are less desirable.

In order to better understand the significance of the included angle between the intersecting pilot plasma streams, a "zone of interaction" [block z in FIG. 10 (not to scale)] can be defined which is the region of the individual pilot plasma streams just prior to intersection of the streams. In this zone of interaction, significant electromagnetic intersection between the individual streams begins to occur. The electromagnetic interaction of the streams then increases as the actual point of intersection of the streams is approached. The electromagnetic interaction of the streams in this zone of interaction is a function of both the physical distance separating the plasma streams and the magnitude of the individual electromagnetic field surrounding each of the plasma streams. Therefore, it is possible to successfully utilize included angles greater than 60° at the point where the pilot plasma streams are initiated and then deflect the streams such that a resultant included angle of less than 60° is then achieved between the intersecting plasma streams within the zone of interaction as shown in FIG. 10. Furthermore, at plasma transferred arc currents significantly greater than 200 amperes, it is possible to directly utilize included angles greater than 60° since electromagnetic fields of greater magnitude are developed, thereby extending the zone of interaction.

An important feature of the present invention is the chamber formed by the main transfer anode. In all of the embodiments, this chamber is essentially closed except at the nozzle outlet. This establishes a high-pressure region which is believed to significantly increase the velocity of the gas exiting the main transfer anode. Through the injection of a secondary plasma gas in the closed chamber, greater enthalpy/velocity control over the existing plasma is achieved. In addition, this construction allows control over the nature of the secondary plasma-forming gas which is injected into the main transfer anode. In other words, by creating a closed chamber, ambient air is not drawn into the plasma spray apparatus, thereby contaminating the exiting plasma gas. Even without the injection of a secondary gas, the closed chamber approach significantly increases the velocity and thus momentum of the exiting plasma gas. It is also believed that this construction further reduces random secondary arcing between the pilot plasma streams and the entrance to the main transfer anode and produces more symmetrical plasma streams emanating from the pilot plasma guns. Finally, the closed chamber construction also results in contact between the coalesced plasma streams and the main transfer anode bore deeper into the bore which helps stabilize the extended plasma, increasing the plasma voltage and thus the power input to the plasma without the need for a higher plasma current.

Figure 11:
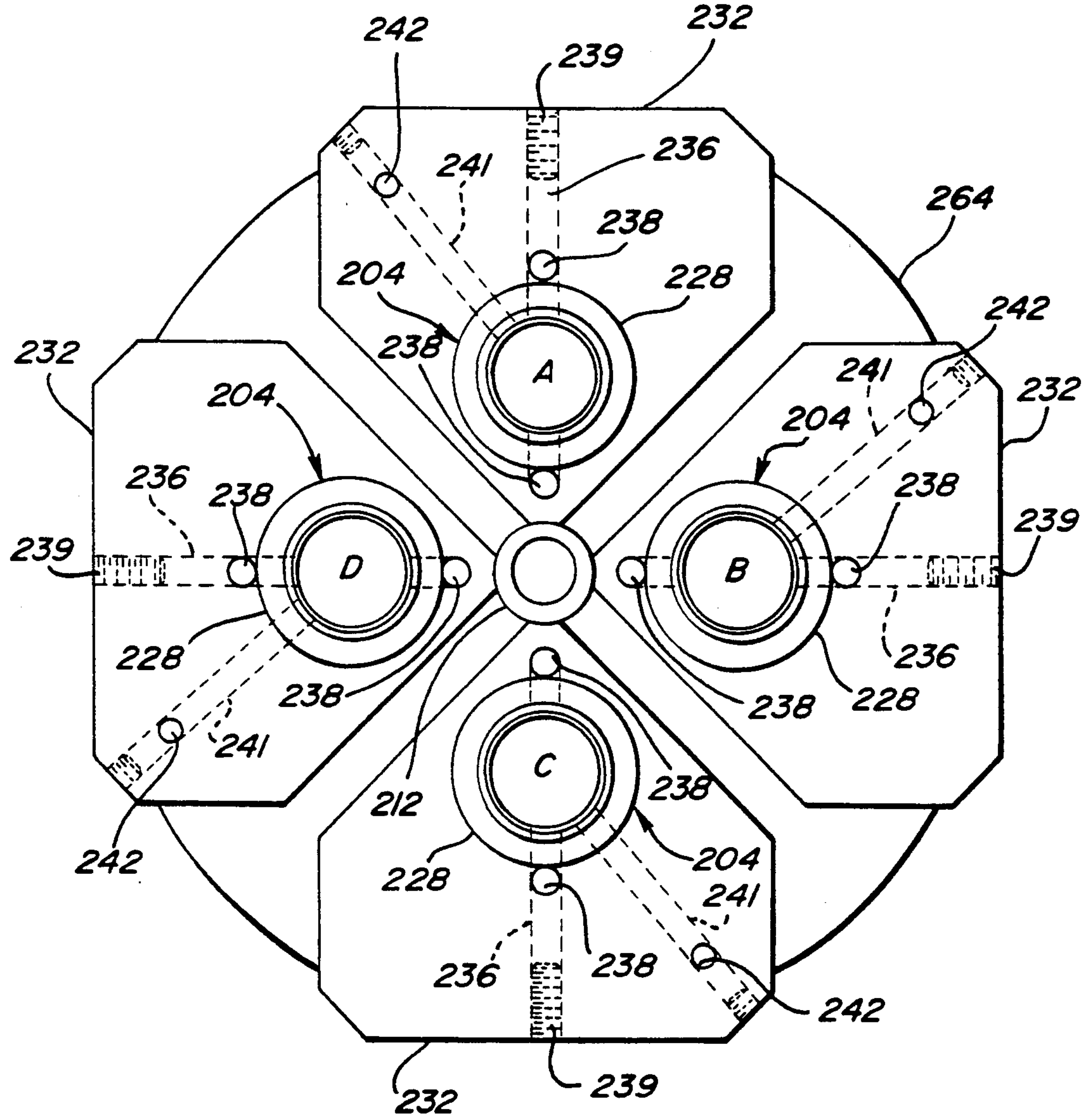
FIG. 11 is a top view of the apparatus of FIG. 10.

It will be appreciated from the foregoing description that in the design depicted in FIGS. 10 and 11, that is, the incorporation of the individual pilot plasma guns as part of one main housing, all of the coolant passages may be fabricated as part of the main housing which simplifies the external water connections otherwise required to cool plasma spray apparatus 200. Similarly, the various gas connections and electrical leads (not shown) are simplified.

Also, in contrast to the previous embodiments, in the embodiment shown in FIGS. 10 and 11, annular anodes 268 are all electrically interconnected by virtue of retainer 272 which is in essence an annular electrically conductive plate having multiple bores into which each anode 268 is received. Thus, annular anodes 268 are all electrically common to each other. This construction allows for very precise, relative alignment of annular anodes 268.

Figure 12:
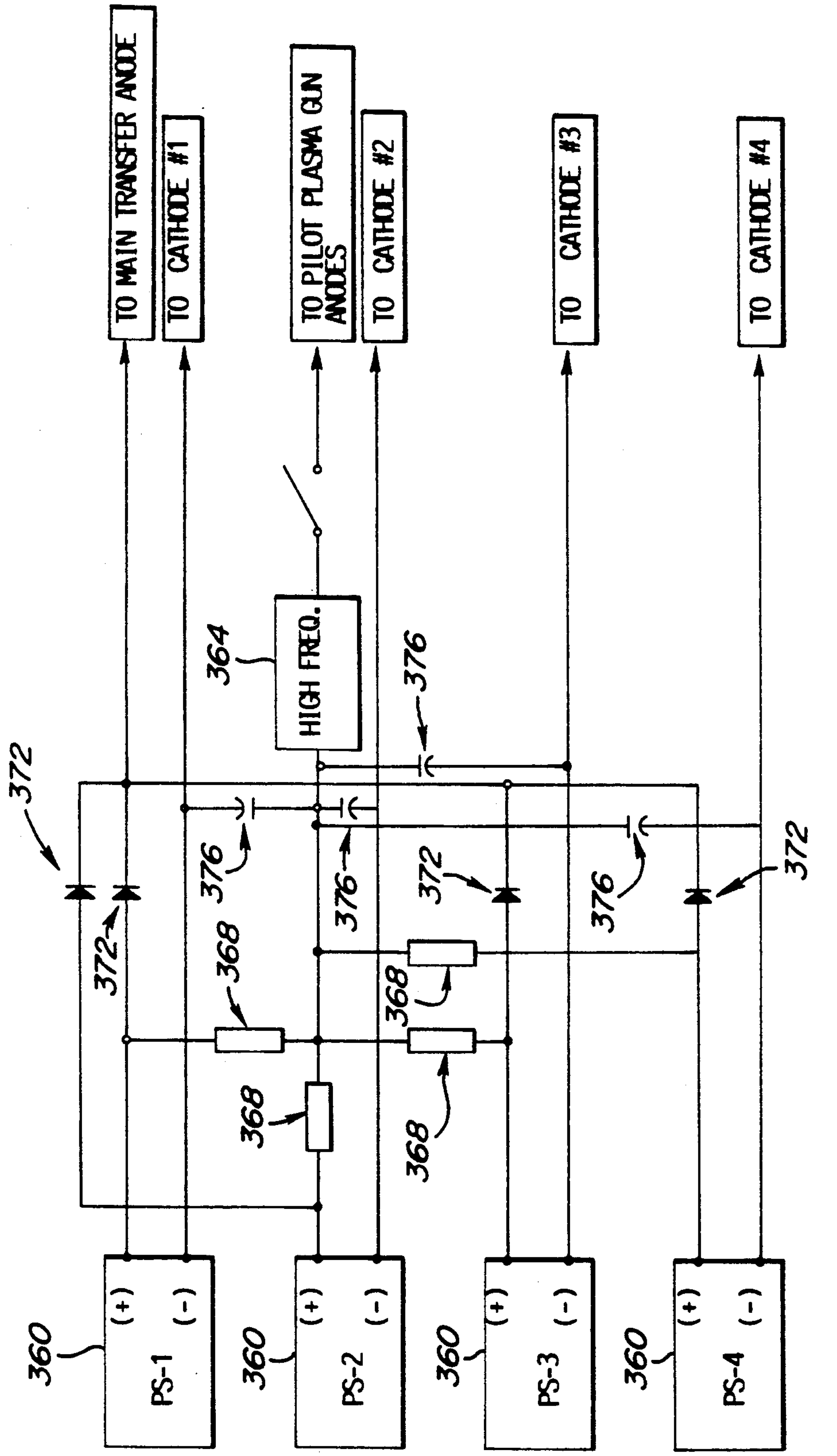
FIG. 12 is a schematic diagram of the preferred power supply configuration.

In addition, by making annular anodes 268 electrically common, the preferred electrical configuration of plasma spray apparatus 200 can be achieved. More specifically, and referring now to FIG. 12 of the drawings, a significant reduction in the number of power supplies required to support plasma spray apparatus 200 is provided by utilizing four DC power supplies 360 and one high frequency supply 364. In this embodiment, four pilot resistors 368 limit the level of pilot plasma current drawn during initiation of the pilot plasmas while at the same time causing a significant voltage difference to be established between each cathode 216 and main transfer 314. The voltage gradient which is thereby produced causes the transfer between the pilot torches and the main anode 314 to occur almost instantaneously and automatically at start up. This transfer occurs consistently each time the pilot plasmas are initiated. Diodes 372 provide electrical blocking or isolation between each of the positive connections of the individual power sources and yet allow them all to be commonly connected to main anode 314. Capacitors 376 provide the return path for the high frequency signal to a common point, and also provides DC isolation from this common point. The start up is significantly simplified in this manner.

It is important to note that the polarities of the present invention as shown in the drawings produce superior results over the reverse polarities in terms of voltage requirements, pilot plasma arc stability, thermal conditions of the pilot plasma torches, deterioration of the pilot plasma gun electrodes, and ease of establishing a transferred arc between the pilot plasma guns and the main transfer anode. Secondary arcing between the pilot gun anodes and the inlet to the main transfer anode is also reduced by the preferred polarities of the present invention.

The flow rates of the plasma-forming gases into the plasma spray apparatus as well as the injection velocity of feedstock may vary widely depending upon the desired temperatures, velocities and particle residence times. As an example of preferred operating parameters, preferred and most preferred ranges are set forth in Table I below (PPG=pilot plasma gun; MP=main plasma; F=feedstock):

TABLE I

| | Preferred | Most Preferred |
|---|---|---|
| PPG plasma gas | Ar | Ar |
| PPG gas flow | 5-20 SCFH | 7 SCFH |
| PPG nozzle opening | .06-.19 in. | .09 in. |
| PPG voltage | 15-30 volts | 24 volts |
| PPG current | 10-30 amps | 20 amps |
| MP discharge opening | .19-.38 in. | .25 in. |
| MP gas | Ar, $O_2$, $N_2$, $CH_4$, He, $H_2$ | Ar/$H_2$ |
| MP gas flow | 50-200 SCFH | 75 SCFH |
| MP voltage | 50-250 volts | 150 volts |
| MP current | 200-500 amps | 350 amps |
| F feed rate (powder) | 1-20 lb/hr. | 6 lb/hr. |
| F feed rate (wire) | 5-100 lb./hr. | 40 lb./hr. |
| MP discharge opening to substrate distance | 2-12 in. | 6 in. |

While a particular embodiment of this invention is shown and described herein, it will be understood, of course, that the invention is not to be limited thereto since many modifications may be made, particularly in light of this disclosure. It is contemplated therefore by the appended claims to cover any such modifications that fall within the true spirit and scope of this invention.

I claim:

1. A plasma spray apparatus, comprising: an anode; means for generating a first plasma stream of ionized plasma gas said first plasma generating means including a first plasma deflecting means coupled to said anode and adapted to receive said first plasma stream and to direct said received stream to said anode; means for generating a second plasma stream of ionized plasma gas intersecting said first plasma stream within aid anode, said second plasma generating means including a second plasma deflecting means; means for extending and electromagnetically coalescing said first and second plasma streams into a free-standing plasma of ionized plasma gas; and means for supplying feedstock into said free-standing plasma, whereby said feedstock is heated and accelerated.

2. The plasma spray apparatus defined in claim 1, characterized in that said means for extending and electromagnetically coalescing said first and second plasma streams includes a main transfer electrode having a bore, and said means of generating said first and second plasma streams comprise pilot plasma spray guns for generating a plasma into said main transfer electrode.

3. The plasma spray apparatus defined in claim 2, characterized in that said spray apparatus includes power supply means for supplying electric power to said plasma spray guns to generate said first and second plasma streams of ionized gas and for supplying electric power to said main transfer electrode to extend and electromagnetically coalesce said first and second plasma streams to form said free-standing plasma.

4. The plasma spray apparatus defined in claim 2, wherein said means for generating said first and second plasma streams further includes a first plasma gas supply means for supplying an inert plasma gas to said pilot plasma spray guns, and said means for extending and electromagnetically coalescing said first and second plasma streams includes a second plasma supply means for supplying a reactive plasma gas to said main transfer electrode.

5. The invention recited in claim 1, wherein said first and second pilot plasma generating means are angularly related to one another.

6. The invention recited in claim 1, wherein said first and second pilot plasma generating means are parallel to one another.

7. An axial feed plasma spray apparatus, comprising:

at least two pilot plasma guns, each of said plasma guns having a rod-shaped cathode with a free end, each of said pilot plasma guns further having an annular body portion surrounding said cathode in spaced relation, each of said annular body portions having an annular anode with a nozzle opening and an angularly disposed outlet portion, and means for supplying a plasma-forming gas to said annular body;

said pilot plasma guns being disposed in a housing and being displaced about a common axis with said cathode free ends extending substantially parallel to said common axis;

a main transfer anode located downstream of said pilot plasma guns having a bore coaxially aligned with said common axis;

means for supplying an electrical bias to said cathodes and said pilot plasma gun anodes to generate an electric arc between said cathodes and said pilot plasma gun anodes thereby generating first and second plasmas of ionized plasma gas exiting said nozzle openings, and for supplying electric power to said cathodes and said main transfer anode thereby extending and electromagnetically coalescing said first and second plasmas into a free-standing plasma within said transfer anode bore;

means for receiving said first and second plasmas of ionized plasma gas and for directing said received plasma gas to said main transfer anode; and axial feedstock supply means for feeding feedstock along said common axis into said free-standing plasma, thereby heating and accelerating said feedstock in particulate form through said main transfer anode bore.

8. The axial feed plasma spray apparatus defined in claim 7, characterized in that said apparatus further includes means for supplying a second plasma-forming gas to said main transfer anode bore, thereby generating said free-standing plasma in said main transfer anode bore.

9. The axial feed plasma spray apparatus defined in claim 7, wherein said pilot plasma guns are symmetrically disposed about said common axis.

10. The axial feed plasma spray apparatus defined in claim 7, wherein said pilot plasma guns are parallel to said common axis.

11. The axial feed plasma spray apparatus defined in claim 7, wherein the outlet of said bore of said main transfer anode has a diameter larger than the diameter of the inlet of said bore.

12. The axial feed plasma spray apparatus defined in claim 11, characterized in that said main transfer anode includes a throat having a cone-shaped portion opening to said bore which receives said first and second plasmas.

13. The axial feed plasma spray apparatus defined in claim 7, characterized in that said apparatus includes three equally and symmetrically spaced pilot plasma guns each generating a plasma directed into said main transfer anode bore.

14. The axial feed plasma spray apparatus defined in claim 7, characterized in that said apparatus includes four equally and symmetrically spaced pilot plasma guns generating a plasma directed into said main transfer anode bore.

15. The axial feed plasma spray apparatus defined in claim 7, characterized in that said means for supplying electric power includes a source of electric power connected to said cathodes and said pilot plasma gun anodes and to said cathodes and said main transfer anode and sequencing means first impressing an electric current between said cathodes and said pilot plasma gun anodes, thereby generating said first and second plasmas, and then impressing an electric current between said cathodes and said main transfer anode, thereby extending and electromagnetically coalescing said first and second plasma into said free-standing plasma.

16. The axial feed plasma spray apparatus defined in claim 7, wherein said plasma spray apparatus includes a powder feedstock supply tube extending between said pilot plasma spray guns and coaxially aligned with said common axis to feed powdered feedstock into said free-standing plasma.

17. The axial feed plasma spray apparatus defined in claim 7, characterized in that said feedstock supply means includes a continuous rod of feedstock and means feeding said rod through said common axis into said free-standing plasma.

18. The axial feed plasma spray apparatus defined in claim 17, characterized in that said means for supplying electric power includes means connected to said rod of feedstock and to said first and second plasmas of ionized plasma gas.

19. The axial feed plasma spray apparatus defined in claim 17, characterized in that said pilot plasma guns are parallel to a common axis and said means for supplying feedstock is coaxially aligned with said common axis.

20. The axial feed plasma spray apparatus defined in claim 17, wherein said second gas supply means supplies a reactive ionizable plasma gas to said main transfer electrode bore.

21. An axial feed plasma spray apparatus, comprising:

a transfer electrode having a nozzle bore therethrough;

at least two pilot plasma guns each including a rod-shaped electrode having a free end, an annular body portion surrounding said rod-shaped electrode in spaced relation therewith and a second annular electrode downstream of said rod-shaped electrode free end;

first power supply means including a source of electric current connected to said rod-shaped electrode and said annular electrode to generate an electric arc therebetween;

means for supplying a substantially inert plasma gas to said annular body portion around said rod-shaped electrode, said first power supply means thereby generating first and second plasmas of ionized gas;

a main transfer electrode defining a bore for receiving said first and second plasmas;

deflection means for receiving said first and second plasmas and for directing said received plasmas to said main transfer electrode;

second power supply means including a source of electric current connected to said rod-shaped electrodes of said pilot plasma guns and to said main transfer electrode;

a second gas supply means for supplying plasma gas to said main transfer electrode bore, said second power supply means energizing said main transfer electrode thereby extending and electromagnetically coalescing said first and second plasmas and ionizing said second plasma gas forming a free-standing plasma in said main transfer electrode bore; and means supplying feedstock to said free-standing plasma in said main transfer electrode bore, thereby heating and accelerating said feedstock in particulate form.

22. A method of plasma spraying, comprising the following steps:

introducing a first plasma of ionized plasma gas into a chamber defined by a housing by coupling a first channel to said chamber and adapting said first channel to receive said first plasma and to transport said received first plasma to said chamber;

introducing a second plasma of ionized plasma gas into said chamber and intersecting said first plasma by coupling a second channel to said chamber and adapting said second channel to receive said second plasma and to transport said second plasma to said chamber so as to allow said second plasma to intersect said first plasma within said chamber;

extending and electromagnetically coalescing said first and second plasmas with an anode into a free-standing plasma of ionized gas; and feeding a feedstock into said chamber through said intersection of said first and second plasmas into said free-standing plasma, said free-standing plasma heating and accelerating said feedstock in particulate form as a spray suspended in said plasma gas.

23. The method of plasma spraying defined in claim 22, wherein said method includes feeding and ionizable plasma gas into said free-standing plasma.

24. The method defined in claim 23, wherein said method includes feeding said ionizable plasma gas tangentially into said free-standing plasma thereby generating a vortex constricting said free-standing plasma.

25. The method of plasma spraying defined in claim 23, wherein said ionizable plasma gas is a reactive ionizable plasma gas and wherein a substantially inert ionizable plasma gas is used to form said first and second plasmas.

26. The method of plasma spraying defined in claim 24, wherein said method includes feeding a reactive ionizable plasma gas into said free-standing plasma, and ionizing said reactive plasma gas.

27. A method of plasma spraying comprising the following steps:

providing a chamber;

generating first and second angularly related plasmas of ionized plasma gas intersecting a common axis by coupling a first channel to said chamber and adapting said first channel to receive said first plasma and to direct said first plasma to said chamber and by coupling a second channel to said chamber and adapting said second channel to receive said second plasma and to direct said second plasma to said chamber so as to allow said second plasma to intersect said first plasma within said chamber;

extending and electromagnetically coalescing said first and second plasmas in a free-standing plasma;

simultaneously feeding an ionizable plasma gas into said free-standing plasma thereby extending said free-standing plasma; and feeding a particulate feedstock through said intersection of said first and second plasmas into said free-standing plasma, said free-standing plasma heating and accelerating said particulate feedstock as a spray.

28. A method of plasma spraying, comprising the following steps performed in sequence:

generating first and second plasmas each generated by flowing an ionizable plasma gas between a pair of electrodes and generating an electric arc between said electrodes;

providing a anode;

providing a first channel between said anode and said pair of electrodes, said first channel being adapted to receive said first plasma and to direct said first plasma to said anode;

providing a second channel between said anode and said pair of electrodes, said second channel being adapted to receive said second plasma and to direct said second plasma to said anode so as to allow said second plasma to intersect said first plasma within said anode;

extending and electromagnetically coalescing said first and second plasmas and forming a free-standing plasma coincident with said common axis by generating an electric arc between said intersecting first and second plasmas and said anode and flowing a second plasma gas through said anode; and feeding a feedstock along said common axis through the intersection of said first and second plasmas into said free-standing plasma, wherein said free-standing plasma heats and accelerates said feedstock in particulate form.

29. An axial feed plasma spray apparatus comprising:

four pilot plasma guns, each including a rod-shaped electrode having a free-end, an annular body portion surrounding said rod-shaped electrode in spaced relation including an annular electrode defining a passage, and means for supplying a first plasma-forming gas to said annular body circulating around said rod-shaped electrode and passing through said passage;

said pilot plasma guns displaced about a common axis;

a main transfer electrode located downstream of said pilot plasma guns having a bore aligned with said common axis;

means for supplying electric power to said rod-shaped electrode and pilot plasma gun annular electrodes to generate an electric arc between said rod-shaped electrode and said pilot plasma gun annular electrode generating first, second, third, and fourth plasmas of ionized plasma gas passing through said passages, and for supplying electric power to said main transfer electrode for extending and electromagnetically coalescing said first, second, third, and fourth plasmas into a free-standing plasma within said main transfer electrode bore;

deflection means in communication with said passages and said main transfer anode for receiving said first, second, third, and fourth plasmas and for transporting said received plasmas to said main transfer electrode;

means for supplying a second plasma-forming gas into said bore of said main transfer electrode; and axial feedstock supply means for feeding feedstock along said common axis into said free-standing plasma, thereby heating and accelerating said feedstock in particulate form through said main transfer electrode bore.

30. The invention recited in claim 29, further including axial feedstock supply means for feeding feedstock along said common axis into said free-standing plasma, thereby heating and accelerating said feedstock in particulate form through said main transfer electrode bore.

31. The invention recited in claim 29, wherein said rod-shaped electrodes are cathodes, said annular electrodes are anodes and said main transfer electrode is an anode.

32. The invention recited in claim 29, wherein said pilot plasma guns are displaced symmetrically about said common axis.

33. The invention recited in claim 29, wherein said pilot plasma guns are oriented parallel to said common axis and wherein each of said annular electrodes has a plasma deflecting portion for deflecting said plasmas toward said common axis.

34. The invention recited in claim 29, wherein said electric power supply means includes four DC power supplies and one high frequency supply.

35. A plasma spray apparatus, comprising:

a housing defining a chamber;

means in association with said housing for generating a first plasma along a first axis, said first plasma generating means having first means for deflecting said first plasma stream along a second axis;

means in association with said housing for generating a second plasma along a third axis, said second plasma generating means having second means for deflecting said second plasma along a fourth axis, said fourth axis intersecting with aid second axis such that said first and second plasmas intersect;

a transfer electrode defining a passage, said transfer electrode being disposed in relation to said first and second plasma generating means such that said plasmas enter said electrode passage; and means in association with said transfer electrode for extending and electromagnetically coalescing said first and second plasma into a free-standing plasma of ionized gas; and means for supplying a feedstock into said passage of said electrode and into the path of said free-standing plasma.

36. The invention recited in claim 35, wherein said first and second axes are substantially parallel to one another.

37. A plasma spray apparatus, comprising:

a housing defining a chamber;

means attached to said housing for introducing a first plasma of ionized plasma gas into said chamber;

means attached to said housing for introducing a second plasma of ionized plasma gas into said chamber;

a transfer electrode having a passage for receiving said first and second plasmas;

means for supplying an electric current through said first and second plasmas to said transfer electrode to extend and electromagnetically coalesce said first and second plasmas into a free-standing plasma of ionized gas; and transporting means, coupled to said passage, for receiving and transporting said first and second plasmas to said chamber;

means for supplying feedstock into said chamber and through said passage of said electrode;

whereby said feedstock is heated and accelerated.

38. A plasma spray apparatus, comprising:

a housing defining a chamber;

first plasma generating means for generating a first plasma of ionized plasma gas issuing into said chamber;

second plasma generating means for generating a second plasma of ionized plasma gas issuing into said chamber and intersecting said first plasma stream;

a transfer electrode defining a passage for receiving said first and second plasmas;

transporting means, coupled to said first and second plasma generating means for transporting said first and second plasmas to said chamber and for allowing said first and second plasmas to intersect within said chamber;

gas introducing means for introducing a plasma-forming gas into said passage of said transfer electrode;

means for supplying an electric current through said first and second plasmas to said transfer electrode to extend and electromagnetically coalesce said first and second plasmas into a free-standing plasma of ionized gas; and means for supplying a feedstock into said passage of said transfer electrode.

39. An axial feed plasma spray apparatus comprising:

four pilot plasma guns mounted on a housing which defines a chamber, each including a rod-shaped electrode having a free-end, an annular body portion surrounding said rod-shaped electrode in spaced relation including an annular electrode having a nozzle opening, and means for supplying a first plasma-forming gas to said annular body such that said plasma-forming gas circulates around said rod-shaped electrode, and exits said annular electrode nozzle opening;

said pilot plasma guns displaced about a common axis;

a main transfer electrode located downstream of said pilot plasma guns having a bore coaxially aligned with said common axis;

means for supplying electric power to said rod-shaped electrode and pilot plasma gun annular electrodes to generate an electric arc between said rod-shaped electrode and said pilot plasma gun annular electrode generating first, second, third, and fourth plasmas of plasma gas exiting said nozzle openings, and for supplying electric power between said rod-shaped electrodes of said pilot plasma guns and said main transfer electrode extending and electromagnetically coalescing said first, second, third, and fourth plasmas into a free-standing plasma within said main transfer electrode bore;

deflection means, coupled between said rod-shaped electrode and said main transfer electrode for receiving said first, second, third and fourth plasmas and for transporting said received plasmas to said main transfer electrode;

means for supplying a second plasma-forming gas which enters said bore of said main transfer electrode; and axial feedstock supply means for feeding feedstock along said common axis into said free-standing plasma, thereby heating and accelerating said feedstock in particulate form through said main transfer electrode bore.

* * * * *

UNITED STATES PATENT AND TRADEMARK OFFICE

CERTIFICATE OF CORRECTION

PATENT NO. : 5,144,110

DATED : September 1, 1992

INVENTOR(S) : Marantz, et al.

It is certified that error appears in the above-identified patent and that said Letters Patent is hereby corrected as shown below:

Co. 18, line 11, "aid" should be "said".

Col. 21, line 10, "and" should be "an".

Col. 23, line 9, "aid" should be "said".

Signed and Sealed this

Eleventh Day of January, 1994

Attest:

BRUCE LEHMAN

*Attesting Officer*

*Commissioner of Patents and Trademarks*